(12) United States Patent
Yu et al.

(10) Patent No.: US 7,965,947 B2
(45) Date of Patent: Jun. 21, 2011

(54) WAVELENGTH DIVISION MULTIPLEXING PASSIVE OPTICAL NETWORK ARCHITECTURE WITH SOURCE-FREE OPTICAL NETWORK UNITS

(75) Inventors: Jianjun Yu, Princeton, NJ (US); Yuanqiu Luo, Highstown, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 637 days.

(21) Appl. No.: 11/867,090

(22) Filed: Oct. 4, 2007

(65) Prior Publication Data

US 2008/0131120 A1 Jun. 5, 2008

Related U.S. Application Data

(60) Provisional application No. 60/868,567, filed on Dec. 5, 2006.

(51) Int. Cl.
*H04B 10/04* (2006.01)
(52) U.S. Cl. .......... 398/185; 398/186; 398/188; 398/67; 398/211
(58) Field of Classification Search .............. 398/58, 398/79, 155, 183, 185, 186, 188, 211, 67
See application file for complete search history.

(56) References Cited

U.S. PATENT DOCUMENTS

| | | | | |
|---|---|---|---|---|
| 4,310,920 A * | 1/1982 | Hayes | ........................... | 370/204 |
| 5,995,256 A * | 11/1999 | Fee | ................................ | 398/34 |
| 6,556,327 B1 * | 4/2003 | Ohya et al. | .................... | 398/198 |
| 7,016,425 B1 * | 3/2006 | Kraiem | ........................ | 375/261 |
| 7,146,109 B2 * | 12/2006 | Chen et al. | .................... | 398/183 |
| 7,346,279 B1 * | 3/2008 | Li et al. | .......................... | 398/32 |
| 7,761,012 B2 * | 7/2010 | Yu et al. | ........................ | 398/188 |
| 2002/0171900 A1 * | 11/2002 | Ono et al. | ...................... | 359/181 |
| 2003/0058504 A1 * | 3/2003 | Cho et al. | ...................... | 359/161 |
| 2003/0076567 A1 * | 4/2003 | Matthews et al. | ............. | 359/181 |
| 2003/0165285 A1 * | 9/2003 | Yu et al. | ......................... | 385/15 |
| 2007/0133987 A1 * | 6/2007 | Xu et al. | ........................ | 398/67 |
| 2007/0133998 A1 * | 6/2007 | Xia et al. | ....................... | 398/155 |
| 2007/0140704 A1 * | 6/2007 | Mauro et al. | .................. | 398/188 |

OTHER PUBLICATIONS

Attygalle et al., Wavelength Reuse Scheme for Source Free Optical Network Units in WDM Passive Optical Networks; ECOC 2006; 2 pages.
Hung et al., An Optical Network Unit for WDM Access Networks with Downstream DPSK and ustream Remodulated OOK Data Using Injection-Locked FP Laser; IEEE Photon Technol. Letter, vol. 15, No. 10; 2003; pp. 1476-1478.
Wong et al., Directly-Modulated Self-Seeding Reflective SOAs as Colorless Transmitters for WDM Passive Optical Netowrks; OFC 2006; p. PDP 49., 3 pages.
Xu et al., Multiple Channel Carrier-Reused WDM Passive Optical Networks; ECOC 2006; PD: Th 4.3.2; 2 pages.

* cited by examiner

*Primary Examiner* — Ken N Vanderpuye
*Assistant Examiner* — Hibret A Woldekidan
(74) *Attorney, Agent, or Firm* — James Bitetto; Joseph Kolodka

(57) ABSTRACT

An optical system and method includes a source-free optical network unit coupled to an optical fiber for receiving an original carrier signal with downstream data over the optical fiber. The optical network unit includes a modulator configured to remodulate the original carrier signal with upstream data to produce an upstream data signal for transmission back down the optical fiber in a direction opposite to a direction in which that original carrier signal was received.

21 Claims, 5 Drawing Sheets

WAVELENGTH DIVISION MULTIPLEXING PASSIVE OPTICAL NETWORK ARCHITECTURE WITH SOURCE-FREE OPTICAL NETWORK UNITS

RELATED APPLICATION INFORMATION

This application claims priority to provisional application Ser. No. 60/868,567 filed on Dec. 5, 2006 incorporated herein by reference.

The present application is related to U.S. application Ser. No. 11/832,075 filed Aug. 1, 2007, entitled "SYSTEM AND METHOD FOR PROVIDING WIRELESS OVER A PASSIVE OPTICAL NETWORK (PON)" and incorporated herein by reference.

BACKGROUND

1. Technical Field

The present invention relates to wavelength division multiplexing passive optical network (WDM-PON) architecture and more particularly to a WDM-PON system and method to simultaneously provide video, voice and data services with a source-free optical network unit (ONU).

2. Description of the Related Art

With the growing amount of Passive Optical Network (PON) subscribers, annual sales of the PON equipment and sales are projected to grow accordingly. Transmission over such networks may be limited by the increasing data demand on existing passive optical networks. Limited bandwidth often results in limited services being provided to customers. Overcoming bandwidth issues by deploying additional fiber is often undesirable due to the large expenses associated therewith.

Furthermore, additional interfaces and/or equipment needed for additional optical fiber branches will further introduce ongoing management costs. Such costs are detrimental to providing broadband and other services in a competitive service provider market.

It would be advantageous to employ pre-constructed PON networks with increased bandwidth and reduced cost, in which traffic is terminated at the PON ONUs (Optical Network Units). Therefore, a need exists for providing service options using existing network hardware with improved multiplexing and modulation schemes that optimize resources and bandwidth.

SUMMARY

In accordance with illustrative embodiments, wavelength division multiplexing passive optical networks (WDM-PON) are employed, which are capable of handling large data bandwidth demands, provide enhanced security, and scalability to support several local subscribers. In addition, there is no need for time-multiplexing and ranging protocols in WDM-PONs. In the implementation of practical WDM-PON networks, one major issue is cost reduction.

Wavelength reuse with source-free optical network units (ONUs) permits a reduction in cost for a whole network. A source-free ONUs is employed in accordance with the present principles to return upstream data without an optical source. In accordance with one embodiment, a carrier signal is reused and employed to carry information both to and from the source-free ONU. This optical carrier is advantageously employed to use all optical power effectively and in a highly efficient operation.

Wavelength division multiplexing passive optical networks (WDM-PON) in accordance with the present principles can be utilized for broadcasting video service or providing triple play services (TPS) including data, video, and voice transmission. A WDM-PON can provide these services without the need to use a new lightwave source for upstream signal modulation. A WDM-PON architecture in accordance with the present principles provides services using centralized lightwave sources to reduce the cost of the system and improve efficiency. High capacity, symmetric data at 10 Gbit/s per channel for both downstream and upstream data, and 2.5 Gbit/s video broadcast have been successfully demonstrated in accordance with the present embodiments.

An optical system and method includes a transceiver configured to modulate a downstream data signal for transmission on an original carrier signal and a first data signal on a sub-carrier signal. A source-free optical network unit is coupled to the transceiver by an optical fiber. The optical network unit has a modulator configured to remodulate the original carrier signal with upstream data to produce an upstream data signal for transmission back to the transceiver.

An optical system includes a source-free optical network unit coupled to an optical fiber for receiving an original carrier signal with downstream data over the optical fiber. The optical network unit includes a modulator configured to remodulate the original carrier signal with upstream data to produce an upstream data signal for transmission back down the optical fiber in a direction opposite to a direction in which that original carrier signal was received.

An optical system includes a transceiver configured to modulate a downstream data signal for transmission on an original carrier signal and modulate a first data signal on a sub-carrier signal. A source-free optical network unit is coupled to the transceiver by an optical fiber. The optical network unit has a modulator configured to remodulate the original carrier signal with upstream data to produce an upstream data signal for transmission back to the transceiver.

An optical system includes a transceiver configured to phase modulate a downstream data signal for transmission on an original carrier signal and intensity modulate a first data signal on a sub-carrier signal. A source-free optical network unit is coupled to the transceiver by an optical fiber. The optical network unit has a modulator configured to remodulate the original carrier signal with upstream data to produce an upstream data signal for transmission back to the transceiver.

A method for providing a centralized lightwave source includes intensity modulating a first data signal for transmission on at least one subcarrier signal, phase modulating a downstream data signal for transmission on an original carrier signal, receiving the original carrier signal and the sub-carrier signal by a source-free optical network unit coupled to the transceiver by an optical fiber, remodulating the original carrier signal with upstream data to produce an upstream data signal for transmission, and transmitting the upstream data signal back to the transceiver.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Present embodiments include wavelength division multiplexing passive optical network (WDM-PON) architectures capable of providing a large bandwidth and reduced costs. In one embodiment, video, voice and data services are simultaneously provided with a source-free optical network unit (ONU). In a particularly useful embodiment, service has been provided with 2.5 Gbit/s video signals, 10 Gbit/s downstream signals, and 10 Gbit/s upstream signals per channel.

Embodiments of the present invention can take the form of an entirely hardware embodiment, an entirely software embodiment or an embodiment including both hardware and software elements. In a preferred embodiment, the present invention is implemented in hardware having software elements, which include but are not limited to firmware, resident software, microcode, etc.

It is to be understood that the present embodiments are described in terms of a passive optical network (PON); however, other optical networks are contemplated and may benefit for the present teachings. While the FIGS. show illustrative optical hardware configurations, these configuration may be reconfigured or combined to provide functionality within the scope of the present principles.

Figure 1:
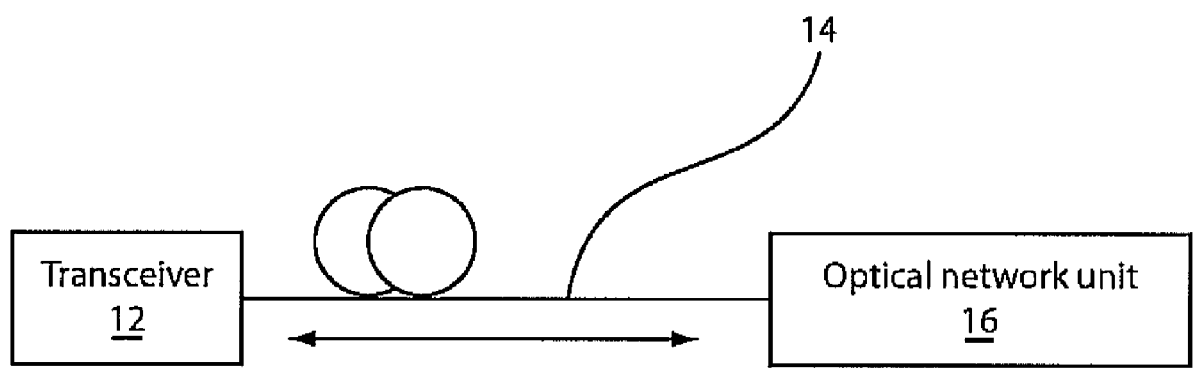
FIG. 1 is a block/flow diagram showing an optical network system in accordance with the present principles.

Referring now to the drawings in which like numerals represent the same or similar elements and initially to FIG. 1, an illustrative system 10 includes a transceiver (transmitter/receiver) 12 connected to an optical fiber 14. The optical fiber 14 preferably connects a source-free optical network unit (ONU) 16 to the transceiver 12 to permit two-way lightwave propagation through the fiber 14 between the transmitter/receiver 12 and the ONU 16.

In accordance with the present principles, a carrier signal is generated for the transmission of data (e.g., downstream data) to the ONU 16 from the transceiver 12. A sub-carrier signal is also generated to carry second data signals (e.g., video) to the ONU 16 from the transceiver 12. In one embodiment, the sub-carrier carries the video signals at at least 2.5 Gbit/s, and at least 10 Gbit/s downstream signals are carried by the optical carrier, which are phase modulated signals.

The carrier signal and sub-carrier(s) are preferably multiplexed using wavelength division multiplexing. The carrier and sub-carrier are transmitted through fiber 14, which is preferably a single mode fiber (SMF). The transmitted signal is received by the ONU 16, and the carrier and subcarrier are separated and the data is removed from each. The phase modulated downstream optical carrier is re-modulated by intensity modulated upstream signals, and returned through fiber 14 to the transmitter/receiver 12. In this way, the carrier signal is reused for bidirectional transmission of data over a same fiber. The ONU 16 does not need an independent light source (hence is source-free).

Figure 2:
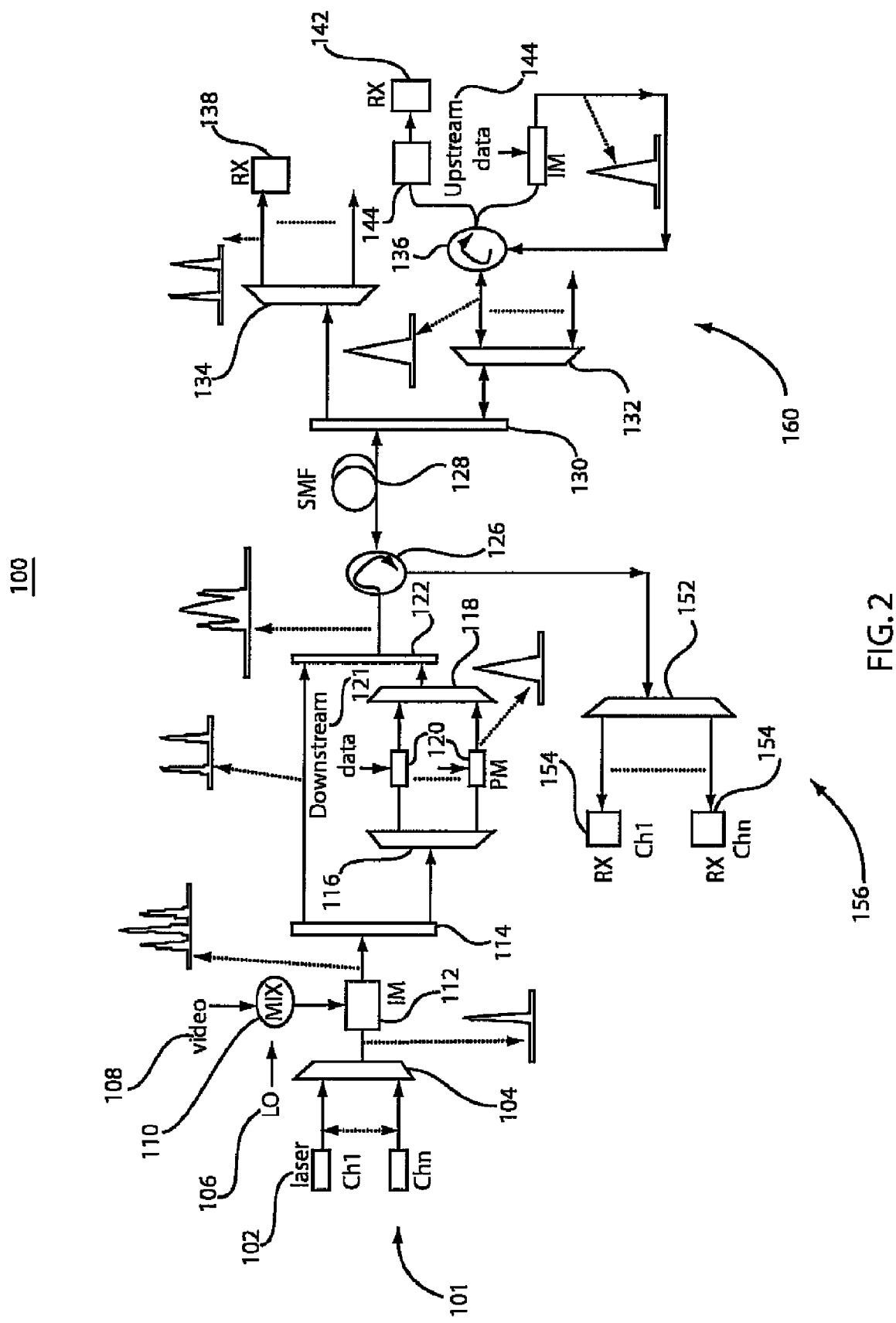
FIG. 2 is a block/flow diagram showing an optical network system which shares a video data signal over multiple wavelengths in accordance with the present principles.

Referring to FIG. 2, an illustrative WDM-PON architecture 100 is shown in greater detail for an exemplary implementation in accordance with the present principles. Architecture 100 includes a network architecture for providing a broadcasting video service, although other broadband services and data types may be employed. Lightwaves 102 are input to a multiplexer 104 on channels (e.g., Ch1-Chn). Channels Ch1-Chn may each have their own laser source 102 or share a laser source depending on the design. Laser source 102 may include a laser, a laser diode, a light emitting diode or any other suitable light source. The channels Ch1-Chn are preferably multiplexed by a multiplexer 104. After multiplexing, all lightwaves are modulated by an external modulator 112 to generate sub-carrier multiplexing signals. Modulator 112 includes a local oscillator 106 and a mixer 110 which mixes video or other data 108 with sub-carrier frequencies to modulate the light.

FIG. 2 shows optical subcarrier multiplexing modulation. When the lightwave carrier is modulated by a subcarrier multiplexing signal, there are subcarrier signals (smaller peaks on opposite sides of the center carrier peak) generated by the intensity modulator 112, which enter an optical interleaver 114. The signals are carried by the subcarrier, and the carrier will be able to carry less information or signal. In this way, the carrier the large center peak) will be more easily re-modulated. Optical carriers and sub-carriers are separated using the optical interleaver 114.

A demultiplexer 116 is employed to separate the carriers before a phase modulator(s) (PM) 120 driven by downstream data 121 modulates each optical carrier. Phase modulation (PM) is a form of modulation that represents information as variations in the instantaneous phase of a carrier wave. Unlike intensity modulation performed by, e.g., intensity modulator 112, the amplitude of the carrier does not change.

Suppose that the signal to be sent, the modulating signal with frequency $\omega_m$ and phase $\phi_m$, is: $m(t)=M \sin(\omega_m t+\phi_m)$, and the carrier onto which the signal is to be modulated is $c(t)=C \sin(\omega_c t+\phi_c)$. Then, the modulated signal is $y(t)=C \sin(\omega_c t+m(t)+\phi_c)$, which shows how m(t) modulates the phase. It can also be viewed as a change of the frequency of the carrier signal. PM can thus be considered a special case of frequency modulation (FM) in which the carrier frequency modulation is given by the time derivative of the phase modulation.

Then, all downstream phase signals at different wavelengths are multiplexed by a multiplexer 118, which may include an arrayed waveguide grating (AWG), before the carriers are combined with the sub-carriers using a second optical interleaver 122. Arrayed waveguide grating (AWG) 118 is employed as an optical multiplexer for wavelength division multiplexing (WDM). AWG 118 device is capable of multiplexing a large number of wavelengths into a single optical fiber 128, thereby increasing the transmission capacity the optical network.

The downstream data 121 and video 108 signals are delivered to an ONU 160 through an optical circulator 126 to an optical fiber 128. In the ONU 160, an interleaver 130 is employed to separate the sub-carriers and phase modulated downstream signals. The sub-carriers at different wavelengths are demultiplexed by a demultiplexer 134 before a detector (e.g., a receiver) 138 directly detects them with a low-pass filter. The phase modulated downstream signals, after being demultiplexed by demultiplexer 132, are sent to two paths. One part is converted to intensity signals by a demodulator 144 before it is detected by a photodiode 142 to realize optical to electrical conversion. The other part is re-modulated by an intensity modulator 140 driven by upstream data 141. The re-modulated signal is fed back to an optical circulator 136 and can be returned back over fiber 128 by demultiplexing the signal with multiplexer 132 and deinterleaving the signal with interleaver 130.

A centralized lightwave is realized in an optical line terminal (OLT) 156. The upstream data are sent back to the OLT 156 by a same fiber 128. In the OLT 156, the upstream data, at different wavelengths, are demultiplexed by demultiplexer 152 before they are optic-electrically converted for each channel using receivers 154.

Advantageously, the carrier lightwave is reused by sending the carrier wave back to the OLT 156 from the ONU 160. The ONU therefore does not need an optical signal source, which would otherwise require power and introduce cost and complexity to the system. Instead, the carrier lightwave is employed to carry video and downstream data in one direction and upstream data in the opposite direction.

Figure 3:
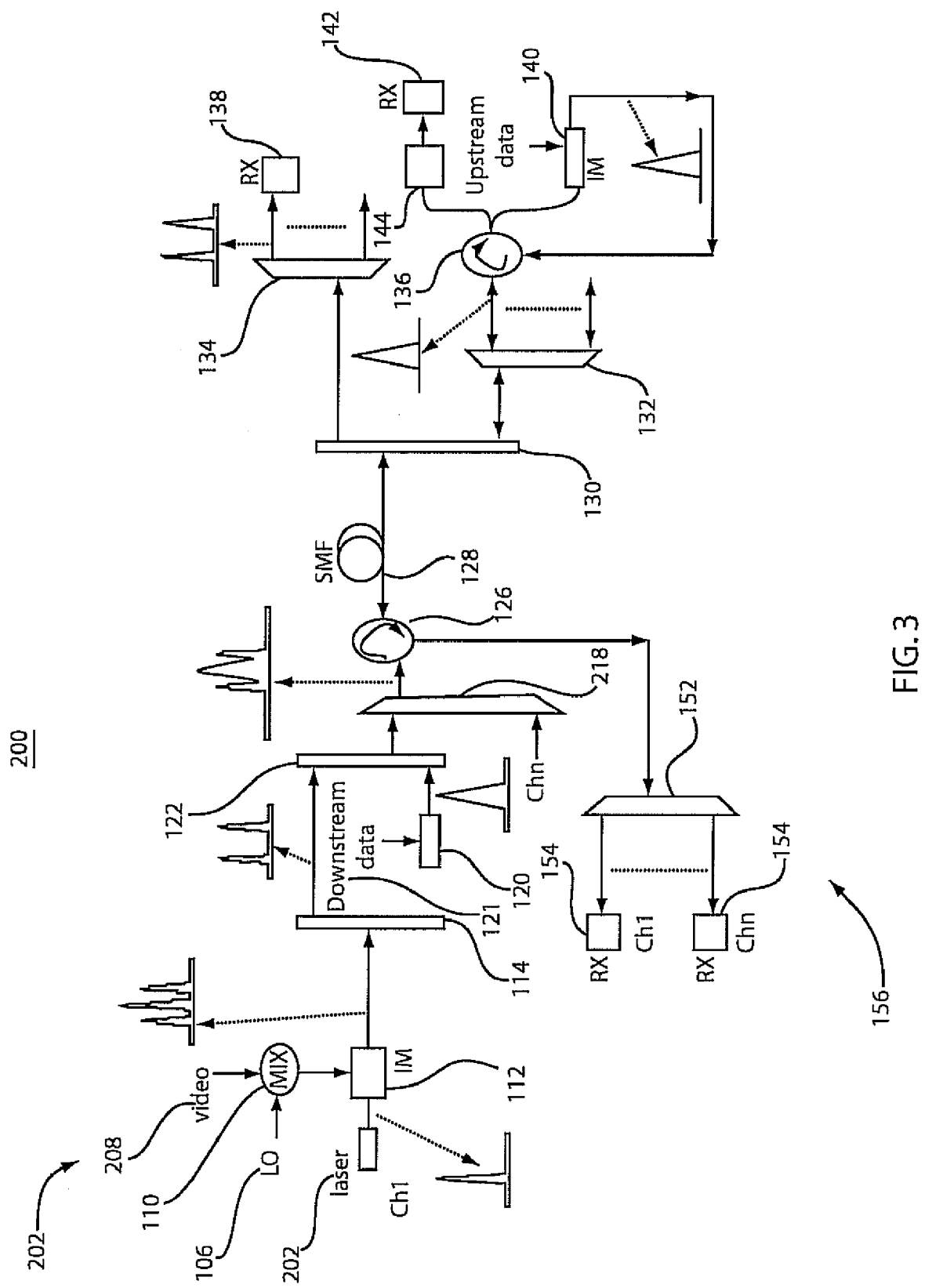
FIG. 3 is a block/flow diagram showing an optical network system which includes one video data signal over a wavelength in accordance with the present principles.

Referring to FIG. 3, if different wavelengths need to carry different video signals 208, architecture 200 may be employed to realize this function. Similar to FIG. 2, only a transmitter configuration 202 needs to be changed. Each lightwave is separately modulated by modulator 112 to generate sub-carrier modulation (SCM) signals. Then, an interleaver 114 separates the carrier and sub-carriers. A phase modulator 120 driven by the downstream data 121 modulates the separated carrier. Then, another interleaver 122 combines the carrier and sub-carrier before all channels are multiplexed by multiplexer 218.

Comparing the configurations of FIG. 2 and FIG. 3, the transmitter of FIG. 2 employs one high-speed intensity modulator (IM) 112 and two interleavers (IL) 114 and 122, three multiplexers 104, 116 and 118, while FIG. 3 employs N high-speed intensity modulators (IM) 112 (one for each video signal), 2N inter-leavers (14, 122) and one multiplexer 218 in the transmitter when the channel number is N. The transmitter in FIG. 3 may be more expensive.

Figure 4:
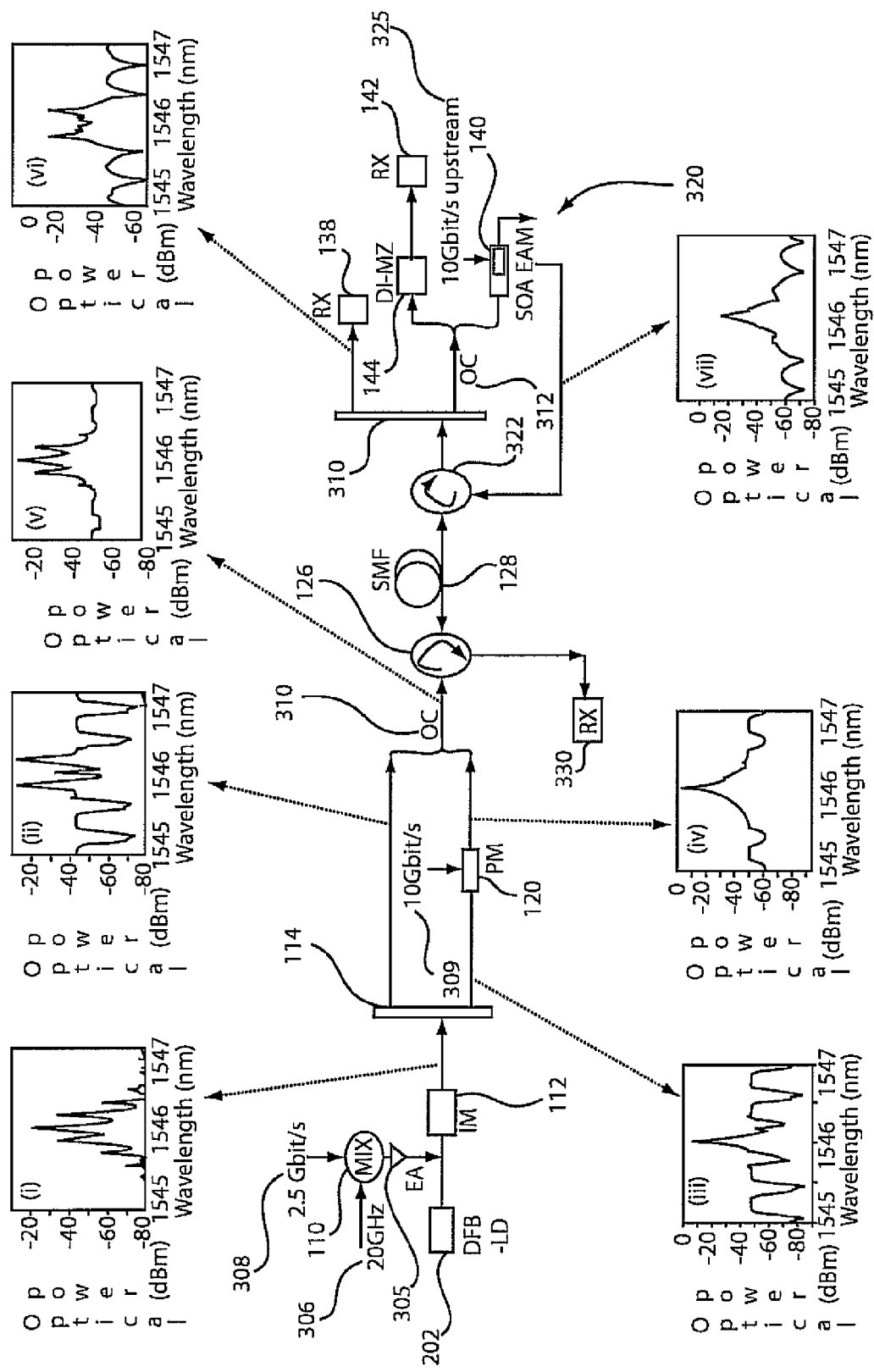
FIG. 4 is a block/flow diagram showing an experimental step for demonstrating the present principles.

Referring to FIG. 4, an experimental setup 300 is illustratively shown for demonstration of the present principles. While FIG. 4 and the description herein provide specific equipment, magnitudes and settings, this information is for illustrative purposes and should not be construed as limiting the present invention. Variations and combinations of the equipment, magnitudes and settings as described here can be modified depending of the design application and preferences of the implementer.

2.5 Gbit/s video signals 308 generated from a pattern generator (not shown) with a pseudo-random bit sequence (PRBS) word length of $2^{31}-1$ were mixed with a 20 GHz sinusoidal wave 306. The signals were mixed in a mixer 110 and used to drive an intensity modulator 112, e.g., a $LiNbO_3$ modulator, after amplification by an electrical amplifier 305.

The optical spectrum after the intensity modulator 112 is inserted in FIG. 4 as inset (i). A carrier suppression ratio (the ratio of the optical carrier to subcarrier at the first-order mode) is 12 dB as indicated in inset (i). An optical interleaver 114 with 50/25 GHz and two output ports to separate the optical carrier and the sub-carriers was employed. The optical spectra are shown in insets (ii) and (iii). The separated optical carrier was modulated by a phase modulator 120 driven at 10 Gbit/s electrical signals (downstream phase signals 309) generated from another pattern generator (not shown) with a PRBS word length of $2^{31}-1$. The optical spectrum after phase modulation is shown in inset (iv) of FIG. 4. Then, the phase downstream signals were combined with the video signals using a 3 dB optical coupler (OC) 310. The optical spectrum of the combined the signals is shown in inset (v) of FIG. 4.

Figure 5:
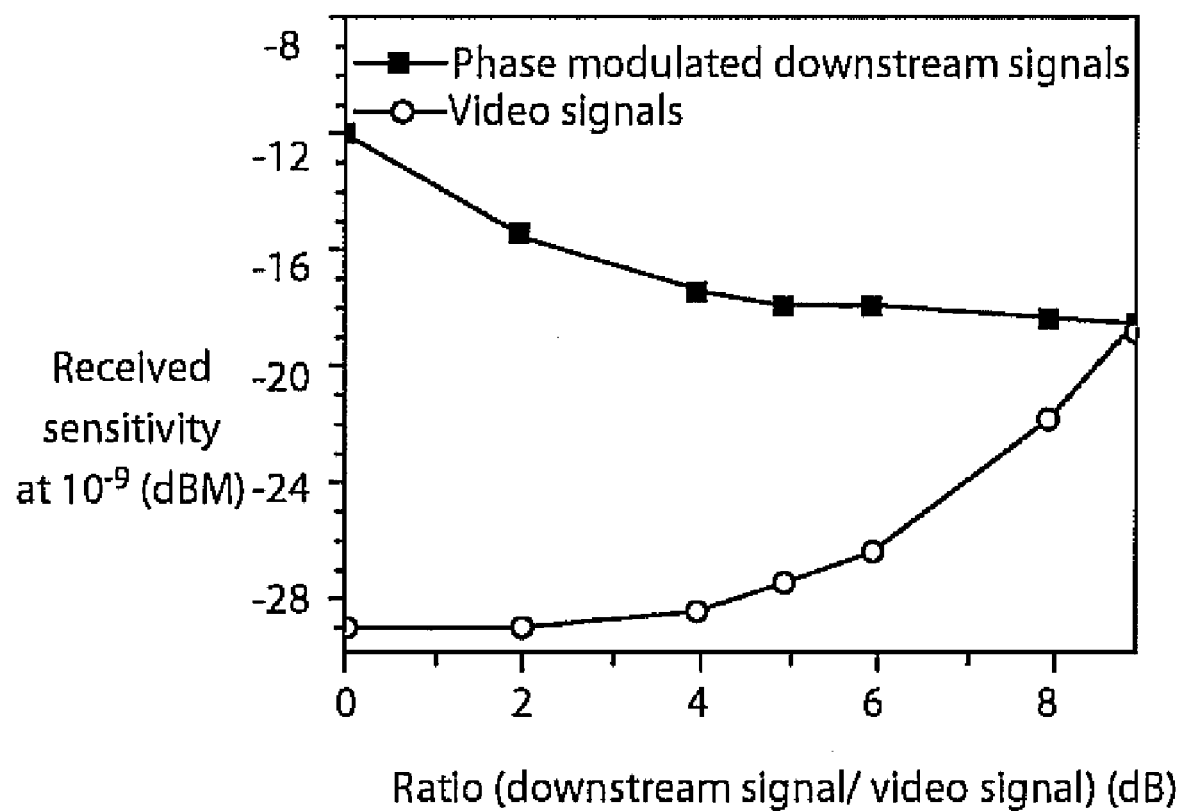
FIG. 5 is a graph showing receiver sensitivity versus power ratio between downstream signals and video signals.

Here, the power levels of the video signals 308 and downstream phase signals 309 have to be chosen properly because the video signals 308 and downstream phase signals 309 have to be separated in an GNU 320 and there may be some linear cross-talk between the video and phase signals. We measured the receiver sensitivity of the video and phase modulated downstream signals with different ratios, which are defined as the power of phase downstream signals divided by the power of video signals. The measured results without transmission fiber are illustratively shown in FIG. 5. When the ratio is 5 dB, the video and downstream signals have good receiver sensitivities. So, we set the power of the downstream signals to be 5 dB larger than the video signals with two sidebands in this experiment.

The combined signals were sent to the ONU 320 after passing through one optical circulator 126 to a fiber 128 (e.g., over a single mode fiber, in this case, 20 km SMF-28), and another optical circulator 322. To overcome the effect of the Rayleigh reflection scattering, the total power for the video signals and downstream signals into the fiber was 6 dBm. In the ONU 320, one delay line Mach-Zehnder interferometer (DI-MZ) 310 with 44 GHz free spectral range (FSR) was employed to separate the phase downstream signals and video signals. A commercial 2.5 GHz receiver 138 directly detected the video signals with an APD receiver and 2 GHz low-pass filter. The separate optical spectrum is shown in FIG. 4 as inset (vi).

The power penalty caused by the transmission fiber was 0.4 dB at a BER of $10^{-9}$. The separated phase downstream signals were separated into two parts by a 3 dB optical coupler 312. One part was converted into the intensity signals by using a DI-MZ interferometer 144 with FSR of 20 GHz. For the 10 Gbit/s downstream (309) and upstream (325) signals, we use PIN receivers to detect these signals. The power penalty caused by the transmission fiber is negligible. The other part was re-modulated driven by another 10 Gbit/s electrical signal with a PRBS length of $2^{31}-1$. The optical spectrum after re-modulation is shown in inset (vii) of FIG. 4. An integrated semiconductor optical amplifier (SOA) and electro-absorption modulator (EAM) 140 was employed to amplify and modulate the signals. The pure gain of the integrated SOA and EAM is 4 dB when the dc bias of the SOA is 120 mA and EAM dc bias is −1.4 V. The upstream signals 325 were delivered back to OLT 330 after passing through the circulator 126, the fiber (e.g., 20 km SMF-28), and the second circulator 322. The power penalty after transmission was negligible. The receiver sensitivity due to the intensity noise may be degraded a small amount. The PIN receiver sensitivity at a BER of $10^{-9}$ is −15 dBm.

A novel WDM-PON configuration with centralized lightwaves in the OLT is provided. Illustrative embodiments provide sufficient bandwidth to provide services with at least 2.5 Gbit/s video, 10 Gbit/s downstream and 10 Gbit/s upstream service. In one network embodiment, a sub-carrier carries the video signals at 2.5 Gbit/s, and the 10 Gbit/s downstream signals are carried by the optical carrier, which are phase modulated signals. The phase modulated downstream optical carrier is re-modulated by intensity modulated upstream signals. The power penalty for video signals after transmission was 0.4 dB at a BER of $10^{-9}$, while the power penalty is negligible for the downstream and upstream signals after transmission over 20 km SMF-28.

Having described preferred embodiments of a wavelength division multiplexing passive optical network architecture with source-free optical network units (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An optical system, comprising:
a source-free optical network unit coupled to an optical fiber for receiving an original carrier signal with downstream data and an optical sub-carrier signal with other data over the optical fiber;
the optical network unit including:
an optical interleaving component configured to separate the original carrier signal from the optical sub-carrier signal; and
a modulator configured to remodulate the original carrier signal with upstream data to produce an upstream data signal for transmission back down the optical fiber in a direction opposite to a direction in which that original carrier signal was received,
wherein the optical network unit receives the original carrier with phase modulated downstream data and receives the optical sub-carrier with intensity modulated other data.

2. The system as recited in claim 1, wherein the original carrier includes a plurality of downstream signals multiplexed using wavelength-division multiplexing (WDM).

3. The system as recited in claim 1, wherein the modulator of the optical network unit includes an intensity modulator configured to remodulate the original carrier signal.

4. The system as recited in claim 1, wherein the system simultaneously supports video, voice and data services.

5. An optical system, comprising:
a transceiver configured to modulate a downstream data signal for transmission on an original carrier signal and to modulate a first data signal on an optical sub-carrier signal;
an intensity modulator configured to modulate the first data on the sub-carrier signal;
a phase modulator configured to phase modulate the downstream data on the carrier signal;
an optical interleaving component configured to combine the sub-carrier signal and the carrier signal; and
a source-free optical network unit coupled to the transceiver by an optical fiber, the optical network unit having a modulator configured to remodulate the original carrier signal with upstream data to produce an upstream data signal for transmission back to the transceiver.

6. The system as recited in claim 5, further comprising a plurality of phase modulated downstream data signals and at least one multiplexer configured to multiplex the plurality of downstream signals using wavelength-division multiplexing (WDM).

7. The system as recited in claim 5, wherein the modulator of the optical network unit includes an intensity modulator configured to remodulate the original carrier signal.

8. The system as recited in claim 5, wherein the transceiver includes an optical terminal line and the upstream data signal is wavelength division multiplexed to a plurality of channels.

9. The system as recited in claim 5, wherein the system simultaneously supports video, voice and data services.

10. The system as recited in claim 5, wherein the first data signal includes a rate of at least 2.5 Gbits/sec, and the upstream and downstream signals include a data rate of at least 10 Gbits/sec.

11. An optical system, comprising:
a transceiver configured to phase modulate a downstream data signal for transmission on an original carrier signal and intensity modulate a first data signal on an optical sub-carrier signal;
an optical interleaving component configured to combine the original carrier signal and the optical sub-carrier signal; and
a source-free optical network unit coupled to the transceiver by an optical fiber, the optical network unit having a modulator configured to remodulate the original carrier signal with upstream data to produce an upstream data signal for transmission back to the transceiver.

12. The system as recited in claim 11, wherein the transceiver further comprises an optical line terminal configured to receive the upstream data signal transmitted on the original carrier signal.

13. The system as recited in claim 11, wherein the transceiver further comprises a plurality of phase modulators configured to phase modulate the downstream data on the carrier signal where each of the modulators phase modulates at a different wavelength.

14. The system as recited in claim 11, wherein the modulator of the optical network unit includes an intensity modulator configured to remodulate the original carrier signal.

15. The system as recited in claim 11, wherein the optical terminal line includes a wavelength division multiplexer to multiplex the upstream data signal to a plurality of channels.

16. The system as recited in claim 11, wherein the system simultaneously supports video, voice and data services.

17. The system as recited in claim 11, wherein the first data signal includes a rate of at least 2.5 Gbits/sec, and the upstream and downstream signals include a data rate of at least 10 Gbits/sec.

18. A method for providing a centralized lightwave source, comprising:
intensity modulating a first data signal for transmission on at least one optical subcarrier signal;
phase modulating a downstream data signal for transmission on an original carrier signal;
optically interleaving the optical subcarrier signal and the original carrier signal for transmission:,
receiving the original carrier signal and the sub-carrier signal by a source-free optical network unit coupled to the transceiver by an optical fiber;
remodulating the original carrier signal with upstream data to produce an upstream data signal for transmission; and
transmitting the upstream data signal back to the transceiver.

19. The method as recited in claim 18, further comprising multiplexing a plurality of phase modulated downstream data signals using wavelength-division multiplexing (WDM).

20. The method as recited in claim 18, wherein remodulating includes intensity modulating the original carrier signal with the upstream data signal.

21. The method as recited in claim 18, further comprising supporting video, voice and data services simultaneously.

* * * * *